US005626079A

United States Patent [19]
Summers

[11] Patent Number: 5,626,079
[45] Date of Patent: May 6, 1997

[54] OSCILLATING TURNTABLE FOR DISPLAYING VEHICLES

[75] Inventor: Rodney E. Summers, Grand Blanc, Mich.

[73] Assignee: Advanced Vehicle Concepts, Inc., Grand Blanc, Mich.

[21] Appl. No.: 583,555

[22] Filed: Jan. 5, 1996

[51] Int. Cl.⁶ .................................................... B60S 13/00
[52] U.S. Cl. .............................................. 104/44; 108/22
[58] Field of Search ................................ 104/35, 36, 37, 104/38, 39, 40, 41, 42, 43, 44, 45, 46; 108/20, 21, 22; 40/415, 430, 435, 493, 495, 501

[56] References Cited

U.S. PATENT DOCUMENTS

| | | | |
|---|---|---|---|
| 1,234,033 | 7/1917 | Iseman | 104/46 |
| 1,378,898 | 5/1921 | Potts . | |
| 1,979,262 | 11/1934 | Berkeley . | |
| 2,075,833 | 4/1937 | Smith . | |
| 2,075,918 | 4/1937 | Waalkes . | |
| 2,181,021 | 11/1939 | Lockwood et al. . | |
| 2,324,343 | 7/1943 | Wharton | 108/22 |
| 2,582,623 | 1/1952 | Douglas . | |
| 3,246,613 | 4/1966 | Johnston et al. . | |
| 3,583,326 | 6/1971 | Poissant | 104/44 |
| 4,498,398 | 2/1985 | Vallee | 104/44 |
| 4,619,208 | 10/1986 | Kurrasch . | |
| 5,013,203 | 5/1991 | Wakabayashi | 104/35 |
| 5,024,168 | 6/1991 | Stravitz . | |
| 5,109,989 | 5/1992 | Kremmin et al. . | |
| 5,421,271 | 6/1995 | Sui . | |

FOREIGN PATENT DOCUMENTS 2183576   6/1987   United Kingdom .

*Primary Examiner*—Mark T. Le
*Attorney, Agent, or Firm*—Howard & Howard Attorneys

[57] ABSTRACT

An oscillating, modular turntable for displaying objects includes a base formed from a ring-like lower track having a generally circular upwardly facing lower track surface formed thereon, a hub assembly and a plurality of spokes extending between the lower track and the hub assembly and releasably attached thereto by a plurality of toggle clamps. The turntable also includes a lower table having a plurality of support wheels resting on the lower track surface and a generally circular upwardly facing upper track surface formed thereon extending in a plane tilted at a predetermined angle relative to a plane in which the base extends and an upper table having a plurality of support wheels resting on the upper track surface. Both tables include a center section having a pair of generally straight sides and a pair of generally semicircular end sections releasably attached to a corresponding one of the straight sides by toggle clamps. A first drive attached to the lower table and engaging the lower track surface rotates the lower table in a selected first direction of rotation at a selected first speed of rotation and a second drive attached to the upper table and engaging the upper track surface rotates the upper table in a selected second direction of rotation at a selected second speed of rotation.

20 Claims, 3 Drawing Sheets

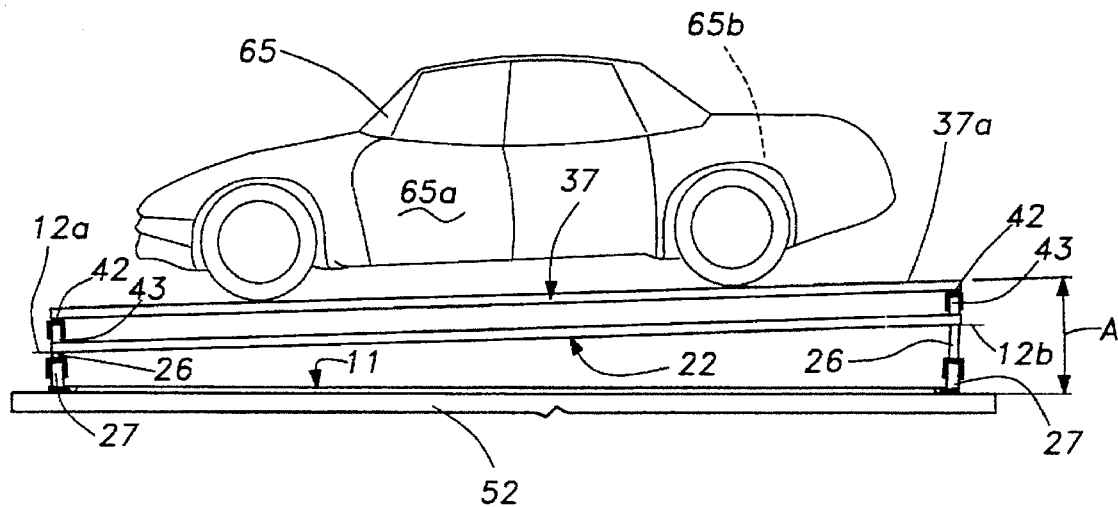
Fig-2
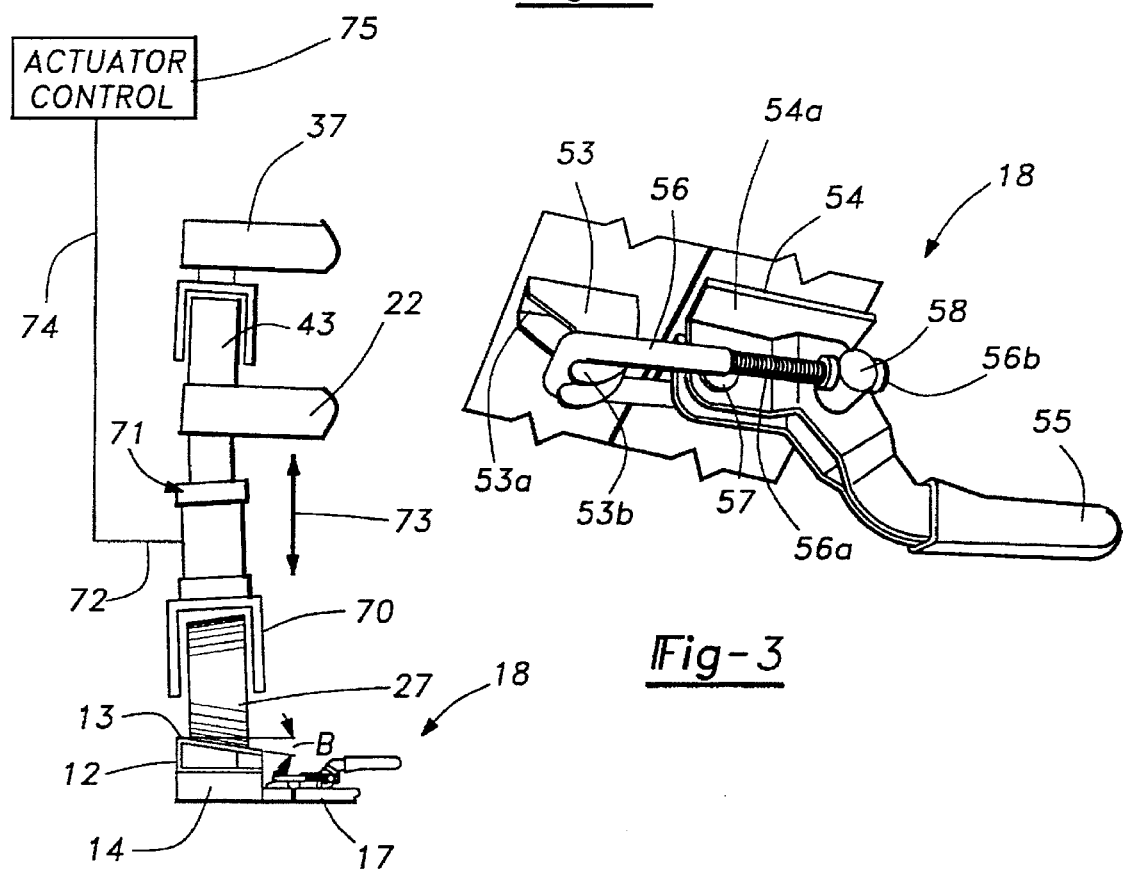
Fig-3
Fig-5

OSCILLATING TURNTABLE FOR DISPLAYING VEHICLES

BACKGROUND OF THE INVENTION

The present invention relates generally to a turntable for displaying objects and, in particular, to a turntable for displaying large objects such as vehicles.

Turntables have been utilized for rotating relatively large objects, such as automobiles, as shown in the U.S. Pat. No. 2,075,918. In a garage or a driveway, where there is not enough space to accommodate the normal turning radius of an automobile, a turntable typically is installed in a pit such that an upper surface of the table is level with the surrounding surface on which the automobile is driven. After the automobile is driven onto the turntable, the turntable is rotated to permit the automobile to be driven off in a new direction.

Turntables also have been used in theater and motion picture stages for moving scenes and actors relative to an audience or a camera. A revolving stage is shown in the U.S. Pat. No. 1,979,363. Other uses of turntables are in manufacturing, as shown in the U.S. Pat. No. 2,075,833, or displays, as shown in the U.S. Pat. No. 2,582,623, to move objects past a fixed work or observation station.

One problem with such known turntables, especially turntables of a large diameter, is that they are relatively difficult to relocate. For example, a turntable utilized to display automobiles for a few days at a show or exhibition must be erected after the preceding event and disassembled before the next scheduled event. In addition, if the exhibitor is travelling from show to show, the turntable must be disassembled into pieces of a size suitable for transportation. Such assembly and disassembly is time consuming and subjects the pieces to potential damage. One solution to this problem has been to provide a folding turntable wherein both the rotating table and the underlying track have a center portion and a pair of flap portions connected to the center portion along hinge lines as shown in the U.S. Pat. No. 3,246,613. For transportation or storage, the flap portions of the table are folded up against the sides of a frame placed on the center portion of the table and the flap portions of the track are folded up against the flap portions of the table. Casters attached to the center portion of the table can be lowered to raise the track portion above the ground thereby permitting the turntable to be moved.

SUMMARY OF THE INVENTION

The present invention concerns a modular turntable for displaying objects including a base supporting a rotatable lower table which supports a rotatable upper table. The base is formed from a ring-like lower track having a generally circular upwardly facing lower track surface formed thereon, a hub assembly, a plurality of spokes and a plurality of clamping means releasably attaching one end of each of the spokes to the hub assembly and releasably attaching another end of each of the spokes to the lower track. The lower table is formed from a center section having a pair of generally straight sides, a pair of generally semicircular end sections and a plurality of clamping means releasably attaching each of the end sections to a corresponding one of the straight sides. A plurality of support wheels attached to the lower table and rest on the lower track surface. The lower table also has a generally circular upwardly facing upper track surface formed thereon and extends in a plane tilted at a predetermined angle relative to a plane in which the base extends. A first drive means is attached to the lower table and engages the lower track surface for moving the lower table support wheels along the lower track surface and rotating the lower table in a selected first direction of rotation at a selected first speed of rotation.

The upper table has a center section having a pair of generally straight sides, a pair of generally semicircular end sections and a plurality of clamping means releasably attaching each of the upper table end sections to a corresponding one of the straight sides of the upper table center section. A plurality of support wheels attached to the upper table rest on the upper track surface. A second drive means is attached to the upper table and engages the upper track surface for moving the upper table support wheels along the upper track surface and rotating the upper table in a selected second direction of rotation at a selected second speed of rotation.

The first drive means includes a variable speed electric motor coupled through a gearbox to a drive wheel attached to the lower table and engaging the lower track surface for moving the lower table support wheels along the lower track surface and a first speed control connected to the variable speed electric motor for selectively controlling the first direction of rotation and the first speed of rotation. The second drive means includes at least one variable speed electric motor coupled through a gearbox to a drive wheel attached to the upper table and engaging the upper track surface for moving the upper table support wheels along the upper track surface and a second speed control connected to the variable speed electric motor for selectively controlling the second direction of rotation and the second speed of rotation.

It is an advantage of the turntable according to the present invention that the base, lower table and upper table are of modular design each being formed of several parts which are attached together by clamping means for easy and quick assembly and disassembly.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 2 is side elevation view of the turntable shown in the FIG. 1;

FIG. 3 is an enlarged side elevation view of the clamping means of the turntable shown in the FIG. 2;

FIG. 5 is fragmentary side elevation view of an alternate embodiment of one of the support legs of the turntable shown in the FIG. 2.

DESCRIPTION OF THE PREFERRED EMBODIMENT

Figure 1:
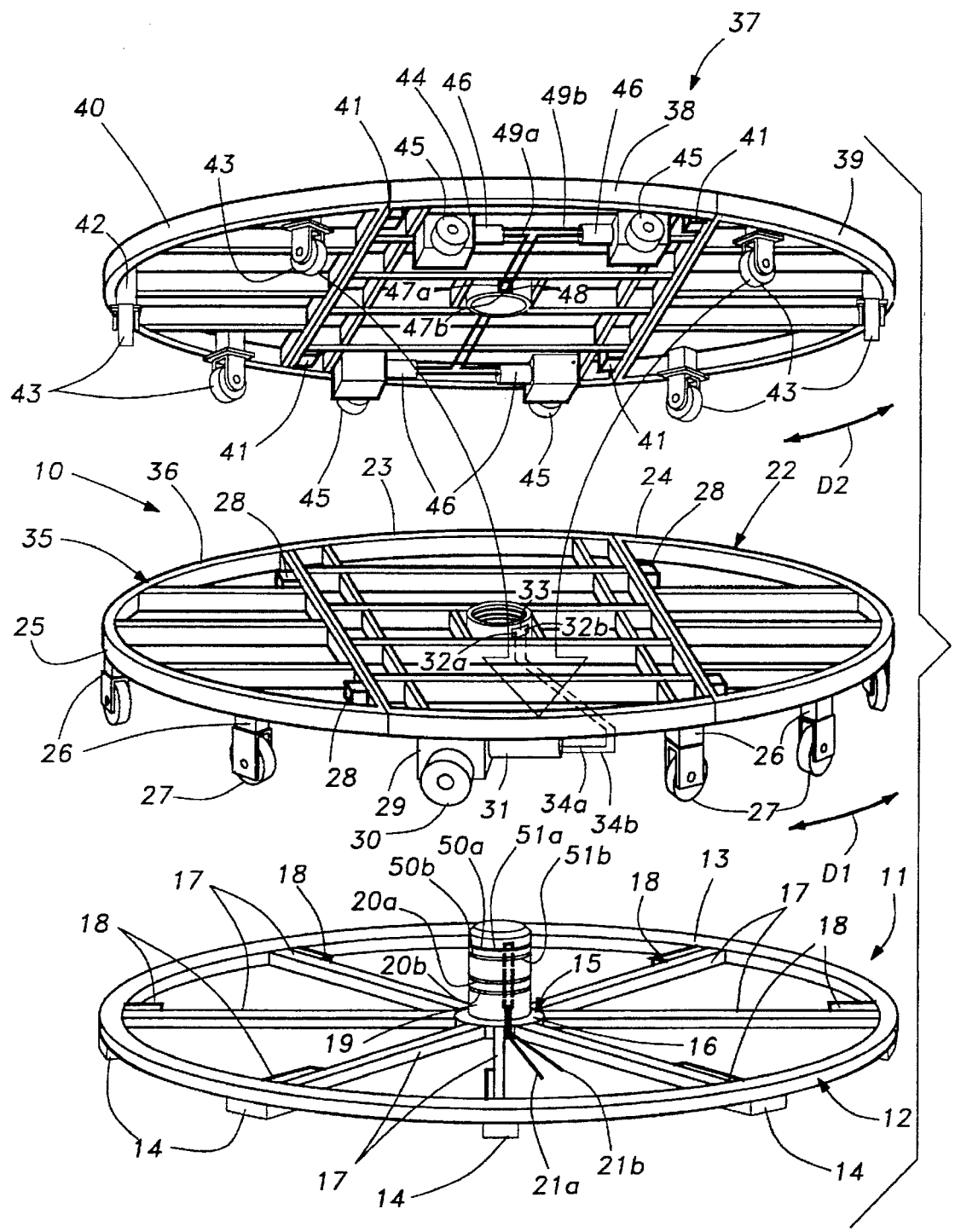
FIG. 1 is an exploded perspective view of a turntable in accordance with the present invention.

There is shown in the FIG. 1 a turntable apparatus 10 of modular construction including a generally circular ground engaging base 11. The base 11 includes a lower ring-like track 12 having an upwardly facing generally planar track surface 13. Although the lower track 12 can rest directly on a generally horizontal planar support surface, such as a floor of a building, a plurality of feet 14 can be attached to a bottom surface of the lower track to space the track from the supporting floor. The base 11 is also provided with a hub assembly 15 including a generally planar and circular plate 16. A plurality of spokes 17 each have one end attached to a periphery of the plate 16 and an opposite end attached to an interior periphery of the track 12, each of the ends being releasably retained by a clamping means 18. Mounted on an upper surface of the plate 16 is a centrally located, generally vertically upwardly extending post 19. Attached to an outer surface of the post 19 is a pair circumferentially extending slip rings 20a and 20b. Attached to the slip rings 20a and 21b are a pair of power lines 21a and 21b respectively. Thus, the modular base 11 has the lower track 12, the hub assembly 15 and the spokes as its major components.

There is positioned above the base 11 a generally planar lower table 22. The table 22 is generally circular and is of modular construction including a center section 23 and a pair of end sections 24 and 25. The center section 23 has a pair of generally parallel straight sides connected at adjacent ends by a pair of shorter curved sides. The end sections 24 and 25 are formed as semicircles, each with a generally straight side for abutting a corresponding one of the straight sides of the center section 23. Attached to a periphery of the lower table 22 is a plurality of support legs 26 which extend downwardly toward the track surface 13. At a lower end of each of the legs 26 there is rotatably attached a support wheel 27 for engagement with track surface 13. The end sections 24 and 25 are releasably attached to opposite ones of the straight sides of the center section 23 by a plurality of releasable clamping means 28. Also extending downwardly from a periphery of the center section 23 is a drive leg 29 having a drive wheel 30 rotatably attached to a lower end thereof. The drive leg 29 has a drive motor and gear box 31 attached thereto for rotating the drive wheel 30. A pair of brushes 32a and 32b are mounted on a bracket 33 attached to and extending downwardly from the center section 23. The brushes 32a and 32b contact the slip rings 20a and 20b respectively when the support wheels 27 are resting on the upper surface 13 of the track 12 for receiving electrical power for the motor 31. The brushes 32a and 32b are connected by a pair of supply lines 34a and 34b respectively to the drive motor 31. Thus, the modular lower table 22 has the center section 23, the one end section 24 and the other end section 25 as its major components.

A periphery of the lower table 22 forms a generally ring-like upper track 35 having an upper track surface 36 formed thereon. Positioned above the lower table 22 is a generally modular upper table 37 which is similar in construction to the lower table having a center section 38, and a pair of end sections 39 and 40. The center section 38 has a pair of generally parallel straight sides connected at adjacent ends by a pair of shorter curved sides. The end sections 39 and 40 are formed as semicircles, each with a generally straight side for abutting a corresponding one of the straight sides of the center section 38. The sections 39 and 40 are attached to the center section 38 with corresponding straight sides abutting by a plurality of releasable clamping means 41. Attached to and extending downwardly from a periphery of the upper table 37 is a plurality of support legs 42. Attached to a lower end of each of the support legs 42 is a rotatably mounted support wheel 43. Also attached to a periphery of the upper table 37 is a plurality of drive legs 44 each of which extends downwardly and has a drive wheel 45 attached to a lower end thereof. Attached to each of the drive legs 44 is a drive motor and gear box 46 for rotating the associated drive wheel 45. A pair of brushes 47a and 47b are mounted on a bracket 48 attached to the center section 38. The brushes 47a and 47b are connected to the drive motor 46 by a pair of supply lines 49a and 49b respectively. Although only one of the drive motors 46 is shown as being connected to the supply lines 49a and 49b, each of the other drive motors is connected by a similar pair of lines to the brushes 47a and 47b. Attached to the outer surface of the post 19 is a pair of circumferentially extending slip rings 50a and 50b spaced above the slip rings 20a and 20b. The slip rings 50a and 50b are connected to a pair of power lines 51a and 51b respectively. When the lower table 22 is mounted on the base 11 and the upper table 37 is mounted on the lower table 22, the brushes 47a and 47b contact the slip rings 50a and 50b respectively to receive power for actuating the drive motors 46. Thus, the modular upper table 37 has the center section 38, the one end section 39 and the other end section 40 as its major components.

As best shown in the FIG. 2, the support legs 26 vary in length such that the lower table 22 extends in a plane which is angled with respect to a generally horizontal plane of a support surface 52 upon which the base 11 is resting. An angle A of inclination of the lower table 22 is measured with respect to a diameter of the lower table extending from a lowest point 12a of the periphery of the table to a highest point 12b of a periphery of the table. The angle A can be of any suitable value, but typically is approximately 5°. Thus, to an observer stationary with respect to the base 11, the periphery of the table 22 will rotate in such a manner that when the lowest point 12a is in front of the observer, the lower table is tilted toward the observer and when the highest point 12b is adjacent the observer, the lower table is tilted away from the observer. The legs 42 attached to the upper table 37 typically are all of the same length such that the upper table 37 and the lower table 22 are generally parallel to one another. Furthermore, the support legs 42 are shorter than the support legs 26 since less clearance is required between the parallel tables than between the base and the tilted lower table.

There is shown in the FIG. 3 one of the clamping means 18. The clamping means 28 and 41 are similar in design and operation and, therefore, will not be described in detail. The clamping means 18 can be of the toggle clamp type including a generally U-shaped hook portion 53 having a generally planar base 53a which typically is attached to the periphery of the lower track 12 or the periphery of the plate 16 and a pair of curved legs 53b attached to the base. A toggle portion 54 of the clamping means 18 has a generally planar base 54a which typically is attached to an end of the spoke 17. The toggle portion 54 includes a lever 55 and a generally U-shaped shackle 56. The lever 55 is pivotally mounted on the base 54a at a pivot point 57. Free ends 56a of the shackle 56 are pivotally attached to opposite sides of the lever 55 at a pivot point 58. In the locked position shown in the FIG. 3, the pivot points 58 are positioned to the right and slightly below the pivot point 57 and a curved portion 56b of the shackle 56 is retained by the curved legs 53b. When the lever 55 is rotated about the pivot point 57 in a counterclockwise direction, the ends 56a of the shackle 56 attached to the lever are moved upwardly and to the left to enable the curved portion 56b of the shackle to disengage from the curved legs 53b. Thus, the clamping means 18, 28 and 41 provide a quick and secure method of assembling and disassembling the modular components of the turntable assembly 10.

Figure 4:
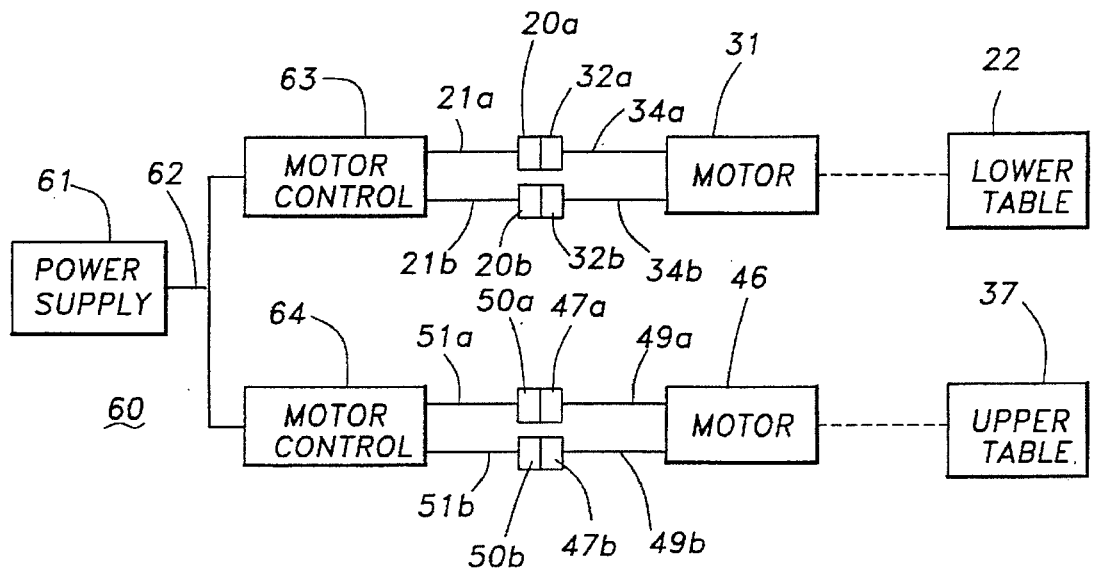
FIG. 4 is schematic block diagram of a control system used with the turntable shown in the FIG. 1.

There is shown in the FIG. 4 a control system 60 for controlling the rotation of the lower turntable 22 and the upper turntable 37. A power supply 61, such as an electrical outlet in a building, is connected by a power supply line 62 to an input of each of a first speed control 63 and a second speed control 64. The first speed control 63 has an output connected by the power line 21a to the slip ring 20a. The slip ring 20a is in contact with the brush 32a which in turn is connected through the supply line 34a to the drive motor 31. In a similar fashion, another output of the speed control 63 is connected by the power line 21b to the slip ring 20b which is in contact with the brush 32b which is connected by the supply line 34b to the motor 31. Typically, the power supply 61 will be a source of alternating current (a.c.) power. The drive motor 31 can be either an a.c. motor or a direct current (d.c.) motor of the variable speed type and the speed control 63 can be of conventional design of the type required to control the speed of the motor utilizing the incoming a.c. power. Although the speed control 63 is typically designed to control the motor 31 to rotate the lower table 22 on the track 12 in one of a clockwise and a counterclockwise direction as indicated by a double headed arrow D1, the speed control could also have the capability of selectively reversing the direction of drive.

The second speed control 64 has an output connected by the power line 51a to the slip ring 50a which is in contact with the brush 47a. The brush 47a is connected to the supply line 49a which in turn is connected to each of the motors 46. The speed control 64 also has an output connected by the power line 51b to the slip ring 50b which is in contact with the brush 47b connected to the supply line 49b. The supply line 49b also is connected to each of the drive motors 46 which are similar to but smaller than the motor 31. In a fashion similar to the first speed control 63, the second speed control 64 regulates the speed and, if desired, the direction of rotation of the motors 46 as indicated by a double headed arrow D2.

If the speed controls 63 and 64 are operated in a manner to rotate the lower table 22 and the upper table 37 in the same direction at the same speed an object such as a car 65 (FIG. 2) positioned on an upper surface 37a of the upper table 37 will be rotated at the constant angle A. For example, if the car 65 is oriented with a first side 65a facing the lowest point 12a and an opposite side 65b facing the highest point 12b, the car will remain tilted at the angle A as it is rotated. However, if the second speed control 64 is operated such as to rotate the upper table 37 at a speed faster or slower than the first speed control 63 is rotating the lower table 22, the angle of the tilt of the car 65 will vary from the position shown in the FIG. 2 through horizontal, although the car and the upper table are never horizontal, to a tilt at the angle A in the opposite direction where the side 65a is adjacent the highest point 12b and the side 65b is adjacent the lowest point 12a. Further variations on the orientation of the car 65 can be achieved by rotating the upper table 37 in a direction opposite the direction of rotation of the lower table 22.

There is shown in the FIG. 5 an alternate embodiment of the support leg 26 which can be utilized to provide additional motion to the car 65. A portion of the lower track 12 is shown in cross-section. The lower track surface 13 can be tilted with respect to a horizontal plane at an angle B inwardly toward the hub assembly 15 (not shown). The tilt of the track surface 13 tends to make the lower table 22 self-centering as it rotates. Although not shown, the upper track surface 36 can be tilted in a similar manner to make the upper table 37 self-centering. The wheel 27 is rotatably supported in a generally U-shaped support bracket 70. The bracket 70 is attached to a lower leg of a support leg 71 having an upper end attached to the bottom periphery of the lower table 22. The support leg 71 can include a linear actuator 72 such as a screw jack which can be extended and retracted in the direction of a double headed arrow 73. The linear actuator 72 is connected by a control line 74 to an output of an actuator control 75. The control 75 can be supplied with power to actuate the linear actuator 72 by connection to the supply lines 34a and 34b, for example. Selective actuation of the control 75 permits variation of the angle A either prior to or during rotation of the lower table 22.

Figure 6:
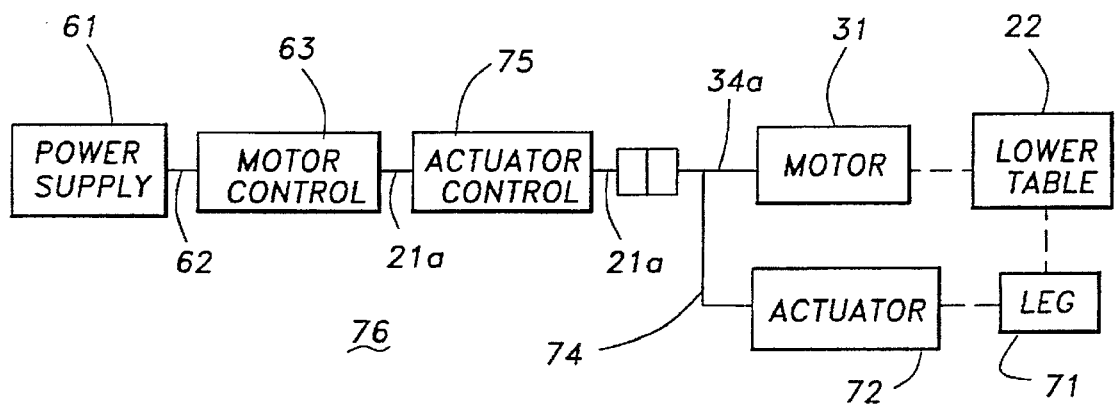
FIG. 6 is schematic block diagram of an alternate embodiment of the control system shown in the FIG. 4.

There is shown in the FIG. 6 an alternate embodiment of the control system 60 shown in the FIG. 4. A control system 76 includes the power supply 61, the first speed control 63, the motor 31 and the lower table 22 shown in the FIG. 4. The actuator control 75 is connected in series in the power line 21a and the control line 74 is connected to the supply line 34a. Although not shown, similar connections are made for the power line 21b and the supply line 34b. Thus, the actuator control 75 can be responsive to control signals superposed on the electric power to actuate the actuator 72 by applying the electric power thereto. The control signals can be generated by the first speed control 63, or a separate signal generator, to selectively control actuation of the actuator 72.

Of course, the upper surface 37a of the upper table 37 and the periphery of the turntable apparatus 10 can be shielded from view by suitable coverings which also mask the movement of the tables 22 and 37 relative to the base 11 and each other. Consequently, the object being displayed can be selectively rotated and/or tilted in an oscillating fashion to provide an eye catching exhibition. Furthermore, the modular construction of the base 11, the lower table 22 and the upper table 37, utilizing the clamping means 18, 28 and 41 respectively, render the turntable apparatus 10 relatively easy to assemble and disassemble.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A turntable for displaying objects comprising:
    a base having a generally circular upwardly facing lower track surface formed thereon;
    a lower table rotatably supported on said lower track surface and having a generally circular upwardly facing upper track surface formed thereon;
    a first drive means attached to said lower table and engaging said lower track surface for rotating said lower table in a selected first direction of rotation at a selected first speed of rotation;
    an upper table rotatably supported on said upper track surface; and
    a second drive means attached to said upper table for rotating said upper table in a selected second direction of rotation at a selected second speed of rotation.

2. The turntable according to claim 1 wherein said first direction of rotation is opposite said second direction of rotation.

3. The turntable according to claim 1 wherein said first speed of rotation is different from said second speed of rotation.

4. The turntable according to claim 1 wherein said base includes a ring-like lower track having said lower track surface formed thereon, a hub assembly, a plurality of spokes and a plurality of clamping means releasably attaching one end of each of said spokes to said hub assembly and releasably attaching another end of each of said spokes to said lower track.

5. The turntable according to claim 1 wherein said lower table includes a center section having a pair of generally straight sides, a pair of generally semicircular end sections and a plurality of clamping means releasably attaching each of said end sections to a corresponding one of said straight sides of said center section.

6. The turntable according to claim 1 wherein said upper table includes a center section having a pair of generally straight sides, a pair of generally semicircular end sections and a plurality of clamping means releasably attaching each of said end sections to a corresponding one of said straight sides of said center section.

7. The turntable according to claim 1 wherein said first drive means includes a variable speed electric motor coupled through a gearbox to a drive wheel attached to said lower table and engaging said lower track surface for moving said lower table support wheels along said lower track surface.

8. The turntable according to claim 7 wherein said first drive means includes a speed control connected to said variable speed electric motor for selectively controlling said first direction of rotation and said first speed of rotation.

9. The turntable according to claim 1 wherein said second drive means includes at least one variable speed electric motor coupled through a gearbox to a drive wheel attached to said upper table and engaging said upper track surface for moving said upper table support wheels along said upper track surface.

10. The turntable according to claim 9 wherein said second drive means includes a speed control connected to said variable speed electric motor for selectively controlling said second direction of rotation and said second speed of rotation.

11. The turntable according to claim 1 wherein said lower table extends in a plane tilted at a predetermined angle relative to a plane in which said base extends.

12. The turntable according to claim 11 including means for selectively changing said predetermined angle.

13. The turntable according to claim 1 including a plurality of support wheels rotatably attached to each of said lower table and said upper table for engaging said lower track surface and said upper track surface respectively.

14. A turntable for displaying objects comprising:
a base having a generally circular upwardly facing lower track surface formed thereon;
a lower table rotatably supported on said lower track surface and having a generally circular upwardly facing upper track surface formed thereon, said lower table extending in a plane tilted at a predetermined angle relative to a plane in which said base extends;
a first drive means attached to said lower table and engaging said lower track surface for rotating said lower table in a selected first direction of rotation at a selected first speed of rotation;
an upper table rotatably supported on said upper track surface; and
a second drive means attached to said upper table for rotating said upper table in a selected second direction of rotation at a selected second speed of rotation.

15. The turntable according to claim 14 wherein said base includes a ring-like lower track having said lower track surface formed thereon, a hub assembly, a plurality of spokes and a first plurality of clamping means releasably attaching one end of each of said spokes to said hub assembly and releasably attaching another end of each of said spokes to said lower track.

16. The turntable according to claim 15 wherein said lower table includes a center section having a pair of generally straight sides, a pair of generally semicircular end sections and a second plurality of clamping means releasably attaching each of said end sections to a corresponding one of said straight sides of said center section.

17. The turntable according to claim 16 wherein said upper table includes a center section having a pair of generally straight sides, a pair of generally semicircular end sections and a third plurality of clamping means releasably attaching each of said end sections to a corresponding one of said straight sides of said center section.

18. The turntable according to claim 1 wherein said clamping means include toggle clamps.

19. A modular turntable for displaying objects comprising:
a base having a generally circular upwardly facing lower track surface formed thereon, said base including a ring-like lower track having said lower track surface formed thereon, a hub assembly, a plurality of spokes and a plurality of clamping means releasably attaching one end of each of said spokes to said hub assembly and releasably attaching another end of each of said spokes to said lower track;
a lower table having a plurality of support wheels attached thereto, said support wheels resting on said lower track surface, said lower support table having a generally circular upwardly facing upper track surface formed thereon, said lower table extending in a plane tilted at a predetermined angle relative to a plane in which said base extends, said lower table including a center section having a pair of generally straight sides, a pair of generally semicircular end sections and a plurality of clamping means releasably attaching each of said end sections to a corresponding one of said straight sides of said center section;
a first drive means attached to said lower table and engaging said lower track surface for moving said lower table support wheels along said lower track surface and rotating said lower table in a selected first direction of rotation at a selected first speed of rotation;
an upper table having a plurality of support wheels attached thereto, said upper table support wheels resting on said upper track surface, said upper table including a center section having a pair of generally straight sides, a pair of generally semicircular end sections and a plurality of clamping means releasably attaching each of said upper table end sections to a corresponding one of said straight sides of said upper table center section; and
a second drive means attached to said upper table and engaging said upper track surface for moving said upper table support wheels along said upper track surface and rotating said upper table in a selected second direction of rotation at a selected second speed of rotation.

20. The turntable according to claim 19 wherein said first drive means includes a variable speed electric motor coupled through a gearbox to a drive wheel attached to said lower table and engaging said lower track surface for moving said lower table support wheels along said lower track surface and a first speed control connected to said variable speed electric motor for selectively controlling said first direction of rotation and said first speed of rotation and wherein said second drive means includes at least one variable speed electric motor coupled through a gearbox to a drive wheel attached to said upper table and engaging said upper track surface for moving said upper table support wheels along said upper track surface and a second speed control connected to said at least one variable speed electric motor for selectively controlling said second direction of rotation and said second speed of rotation.

* * * * *